US012561358B2

(12) United States Patent
Todirel et al.

(10) Patent No.: US 12,561,358 B2
(45) Date of Patent: Feb. 24, 2026

(54) CONTROLLING AND/OR VISUALIZING CONTEXT OF AN ARTIFICIAL INTELLIGENCE PROMPT

(71) Applicant: Microsoft Technology Licensing, LLC, Redmond, WA (US)

(72) Inventors: Ion Todirel, Bellevue, WA (US); Bogdan Ionut Mihalcea, Sammamish, WA (US); Benjamin John McMorran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 18/478,953

(22) Filed: Sep. 29, 2023

(65) Prior Publication Data

US 2025/0110982 A1 Apr. 3, 2025

(51) Int. Cl.
*G06F 16/34* (2025.01)
*G06F 3/0488* (2022.01)
(Continued)

(52) U.S. Cl.
CPC .......... *G06F 16/345* (2019.01); *G06F 3/0488* (2013.01); *G06F 8/33* (2013.01); *G06F 40/30* (2020.01)

(58) Field of Classification Search
CPC ...... G06F 16/345; G06F 40/30; G06F 3/0488; G06F 8/33
See application file for complete search history.

(56) References Cited

U.S. PATENT DOCUMENTS

2013/0151635 A1* 6/2013 Soundrapandian ... H04L 51/046
709/206
2014/0317502 A1* 10/2014 Brown .................... G10L 15/22
715/706
(Continued)

FOREIGN PATENT DOCUMENTS

CN 112099628 A * 12/2020 ............. G06F 3/011
CN 116881441 A * 10/2023 ........... G06F 16/345
(Continued)

OTHER PUBLICATIONS

Data Intelligence and Cognitive Informatics Proceedings of ICDICI 2023I. Jeena Jacob, Selwyn Piramuthu, Przemyslaw Falkowski-Gilski Editors (Year: 2023).*

*Primary Examiner* — Mohammad K Islam
(74) *Attorney, Agent, or Firm* — Wade IP Law PLLC

(57) ABSTRACT

Techniques are described herein that are capable of controlling and/or visualizing context of an artificial intelligence prompt. A user-generated artificial intelligence prompt is detected. In a first technique, a visual representation of contextual information, which includes context regarding the prompt, is generated. Based at least on detection of a user-generated instruction, presentation of the visual representation is triggered. In a second technique, a determination is made that an initial scope of contextual information, which includes context regarding the prompt, includes previous contextual information, which includes context regarding a previous user-generated prompt in a prompt chain that includes the prompt. The initial scope of the contextual information is automatically changed to provide a changed scope that does not include at least a portion of the previous contextual information. An artificial intelligence model is caused to generate an answer to the prompt that is based on the changed scope.

20 Claims, 6 Drawing Sheets

(51) Int. Cl.
    *G06F 8/33*        (2018.01)
    *G06F 40/30*       (2020.01)

(56)                References Cited

U.S. PATENT DOCUMENTS

2025/0028745 A1* 1/2025 Chen ..................... G06F 16/338
2025/0045471 A1* 2/2025 Fitzmaurice ........... G06F 30/12
2025/0077237 A1* 3/2025 Sachindran ............. G06N 3/08
2025/0094725 A1* 3/2025 Vishnoi ................ G06F 40/284

FOREIGN PATENT DOCUMENTS

CN          119106143 A  * 12/2024  ............... G06N 5/04
WO      WO-2024213989 A1 * 10/2024  ........... G06F 16/335

* cited by examiner

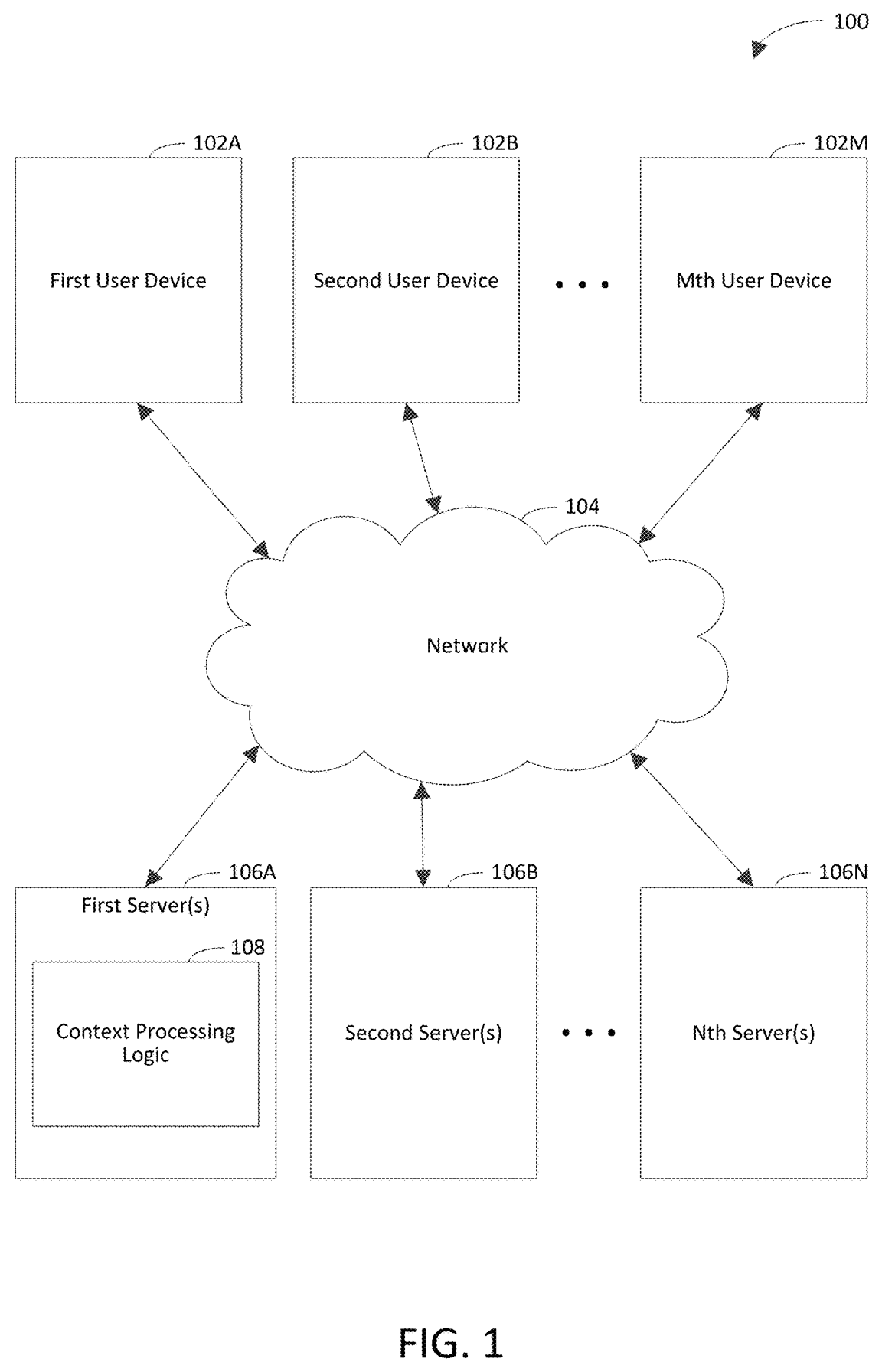

100

102A

First User Device

102B

Second User Device

• • •

102M

Mth User Device

104

Network

106A

First Server(s)

108

Context Processing Logic

106B

Second Server(s)

• • •

106N

Nth Server(s)

FIG. 1

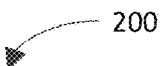

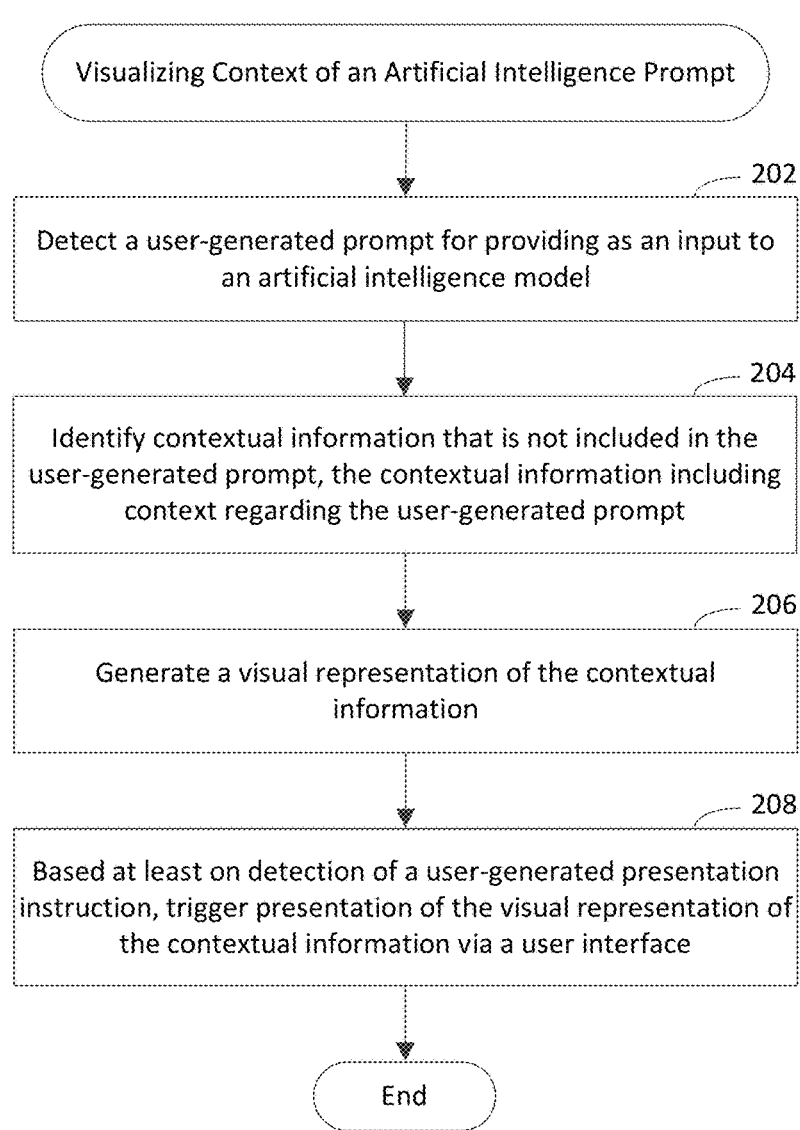

Visualizing Context of an Artificial Intelligence Prompt

— 202

Detect a user-generated prompt for providing as an input to an artificial intelligence model

— 204

Identify contextual information that is not included in the user-generated prompt, the contextual information including context regarding the user-generated prompt

— 206

Generate a visual representation of the contextual information

— 208

Based at least on detection of a user-generated presentation instruction, trigger presentation of the visual representation of the contextual information via a user interface End

FIG. 2

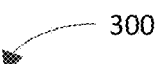

300

Computing System

— 308

Context Processing Logic

— 322

User-Generated Prompt

— 312

Prompt Determination Logic

— 330

Prompt Information

— 324

Contextual Information

— 314

Context Identification Logic

— 334

Element Selection Information

— 324

Contextual Information

— 332

Visual Representation

— 328

User-Generated Presentation Instruction

— 332

Visual Representation

— 316

Presentation Logic

— 336

Scoping Interface Element

— 318

Control Logic

Selectable Interface Elements

— 338

— 322

User-Generated Prompt

— 324

Contextual Information

— 320

Artificial Intelligence Model

— 340

Answer

FIG. 3

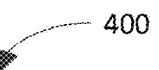

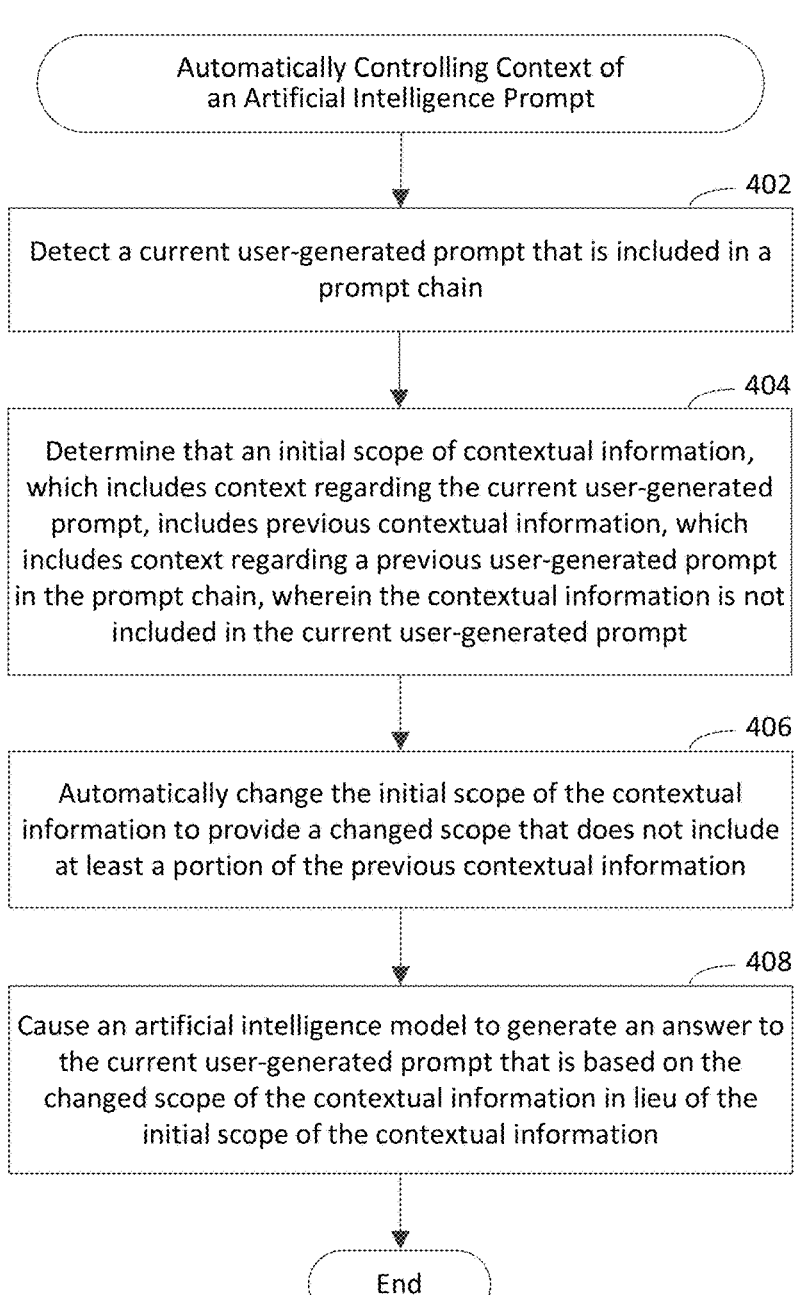

400

```
        ┌─────────────────────────────────────┐
        │   Automatically Controlling Context of  │
        │    an Artificial Intelligence Prompt    │
        └─────────────────────────────────────┘
                          │
                          ▼                    ┌── 402
        ┌─────────────────────────────────────┐
        │ Detect a current user-generated prompt that is included in a │
        │                prompt chain                 │
        └─────────────────────────────────────┘
                          │
                          ▼                    ┌── 404
        ┌─────────────────────────────────────┐
        │ Determine that an initial scope of contextual information, │
        │ which includes context regarding the current user-generated │
        │ prompt, includes previous contextual information, which │
        │ includes context regarding a previous user-generated prompt │
        │ in the prompt chain, wherein the contextual information is not │
        │      included in the current user-generated prompt       │
        └─────────────────────────────────────┘
                          │
                          ▼                    ┌── 406
        ┌─────────────────────────────────────┐
        │ Automatically change the initial scope of the contextual │
        │ information to provide a changed scope that does not include │
        │    at least a portion of the previous contextual information │
        └─────────────────────────────────────┘
                          │
                          ▼                    ┌── 408
        ┌─────────────────────────────────────┐
        │ Cause an artificial intelligence model to generate an answer to │
        │    the current user-generated prompt that is based on the │
        │  changed scope of the contextual information in lieu of the │
        │      initial scope of the contextual information         │
        └─────────────────────────────────────┘
                          │
                          ▼
                     ┌─────────┐
                     │   End   │
                     └─────────┘
```

FIG. 4

CONTROLLING AND/OR VISUALIZING CONTEXT OF AN ARTIFICIAL INTELLIGENCE PROMPT

BACKGROUND

An artificial intelligence model enables a computing system to perform tasks that traditionally are performed using human intelligence. For instance, a user of the artificial intelligence model typically submits an artificial intelligence prompt (a.k.a. "prompt"), along with contextual information that provides a context for the prompt, to the artificial intelligence model. The artificial intelligence model analyzes the prompt and the contextual information to generate an answer that is responsive to the prompt in the context that is indicated by the contextual information. Example types of an artificial intelligence model include but are not limited to linear regression, deep neural network, logistic regression, decision tree, random forest, naïve Bayes, learning vector quantization, and K-nearest neighbor, and support vector machine.

SUMMARY

It may be desirable for a user who submits a prompt to an artificial intelligence model to control (e.g., change) and/or view contextual information that is associated with the prompt. By viewing the contextual information, the user may be able to change a scope of the contextual information prior to the artificial intelligence model generating an answer that is responsive to the prompt, and the user may be able to understand the reasoning behind the answer more clearly. It may be desirable for the artificial intelligence model or other non-human logic to automatically control the contextual information prior to the artificial intelligence model generating the answer. Controlling the contextual information (by the user, the artificial intelligence model, or other logic) may enable the artificial intelligence model to generate a more accurate, precise, or relevant answer.

Various approaches are described herein for, among other things, controlling and/or visualizing context of an artificial intelligence prompt. An artificial intelligence prompt indicates (e.g., specifies) a task that is to be performed by an artificial intelligence model. In an aspect, the artificial intelligence prompt is written in natural language. Examples of an artificial intelligence prompt include but are not limited to a zero-shot prompt, a one-shot prompt, and a few-shot prompt. A zero-shot prompt is a prompt for which the prompt and/or its corresponding contextual information, which are to be processed by the artificial intelligence model, is not included in pre-trained knowledge of the artificial intelligence model. A one-shot prompt is a prompt that includes a target prompt along with a single example prompt and a single example answer that is responsive to the single example prompt. The example prompt and the example answer provide guidance as to how the artificial intelligence model is expected to respond to the target prompt. A few-shot prompt is a prompt that includes a target prompt along with multiple example prompts and multiple example answers that are responsive to the respective example prompts. The example prompts and the example answers provide guidance as to how the artificial intelligence model is expected to respond to the target prompt.

An artificial intelligence model is model that utilizes artificial intelligence to generate an answer that is responsive to a prompt that is received by the artificial intelligence model. The artificial intelligence model may be an artificial general intelligence model. An artificial general intelligence model is an artificial intelligence model (e.g., an autonomous artificial intelligence model) that is configured to be capable of performing any task that an animal (e.g., a human) is capable of performing. In an example implementation, the artificial general intelligence model is capable of performing a task that surpasses the capabilities of an animal. Artificial intelligence is intelligence of a machine (e.g., a processing system) and/or code (e.g., software and/or firmware), as opposed to intelligence of an animal (e.g., a human).

In an example approach, a user-generated prompt for providing as an input to an artificial intelligence model is detected. Contextual information that is not included in the user-generated prompt is identified. The contextual information includes context regarding the user-generated prompt. The contextual information is for providing together with the user-generated prompt to the artificial intelligence model to provide the context to the artificial intelligence model. A visual representation of the contextual information is generated. Based at least on (e.g., as a result of or in response to) detection of a user-generated presentation instruction, presentation of the visual representation of the contextual information via a user interface is triggered.

In another example approach, a current user-generated prompt that is included in a prompt chain is detected. The prompt chain includes a series of related prompts that are for providing as successive inputs to an artificial intelligence model such that a context regarding each related prompt in the series is included in a context regarding a next successive related prompt in the series. A determination is made that an initial scope of contextual information, which includes context regarding the current user-generated prompt, includes previous contextual information, which includes context regarding a previous user-generated prompt in the prompt chain. The contextual information is not included in the current user-generated prompt. The contextual information is for providing together with the current user-generated prompt to the artificial intelligence model to provide the context to the artificial intelligence model. The initial scope of the contextual information is automatically changed to provide a changed scope that does not include at least a portion of the previous contextual information. The artificial intelligence model is caused to generate an answer to the current user-generated prompt that is based on (e.g., based at least on) the changed scope of the contextual information in lieu of the initial scope of the contextual information by providing the current user-generated prompt together with the contextual information having the changed scope in lieu of the initial scope as inputs to the artificial intelligence model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example context process- ing system in accordance with an embodiment.

FIG. 2 depicts a flowchart of an example method for visualizing context of an artificial intelligence prompt in accordance with an embodiment.

FIG. 3 is a block diagram of an example computing system in accordance with an embodiment.

FIG. 4 depicts a flowchart of an example method for automatically controlling context of an artificial intelligence prompt in accordance with an embodiment.

Figure 5:
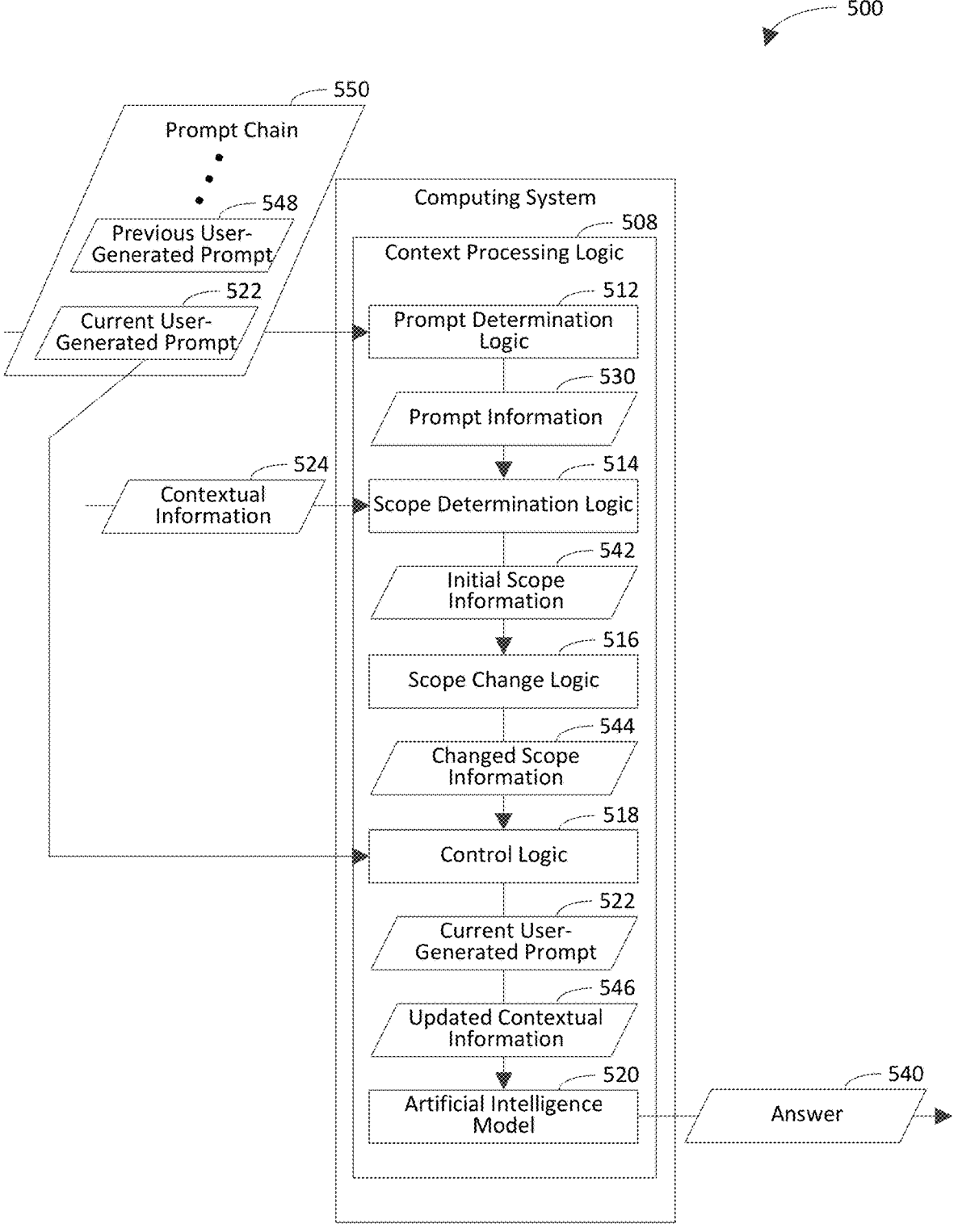
FIG. 5 is a block diagram of another example computing system in accordance with an embodiment.

The features and advantages of the disclosed technologies will become more apparent from the detailed description set forth below when taken in conjunction with the drawings, in which like reference characters identify corresponding ele- ments throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable for a user who submits a prompt to an artificial intelligence model to control (e.g., change) and/or view contextual information that is associated with the prompt. By viewing the contextual information, the user may be able to change a scope of the contextual information prior to the artificial intelligence model generating an answer that is responsive to the prompt, and the user may be able to understand the reasoning behind the answer more clearly. It may be desirable for the artificial intelligence model or other non-human logic to automatically control the contextual information prior to the artificial intelligence model generating the answer. Controlling the contextual information (by the user, the artificial intelligence model, or other logic) may enable the artificial intelligence model to generate a more accurate, precise, or relevant answer.

Example embodiments described herein are capable of controlling and/or visualizing context of an artificial intel- ligence prompt. An artificial intelligence prompt indicates a task that is to be performed by an artificial intelligence model. In an aspect, the artificial intelligence prompt is written in natural language. Examples of an artificial intel- ligence prompt include but are not limited to a zero-shot prompt, a one-shot prompt, and a few-shot prompt. A zero-shot prompt is a prompt for which the prompt and/or its corresponding contextual information, which are to be pro- cessed by the artificial intelligence model, is not included in pre-trained knowledge of the artificial intelligence model. A one-shot prompt is a prompt that includes a target prompt along with a single example prompt and a single example answer that is responsive to the single example prompt. The example prompt and the example answer provide guidance as to how the artificial intelligence model is expected to respond to the target prompt. A few-shot prompt is a prompt that includes a target prompt along with multiple example prompts and multiple example answers that are responsive to the respective example prompts. The example prompts and the example answers provide guidance as to how the artificial intelligence model is expected to respond to the target prompt.

An artificial intelligence model is model that utilizes artificial intelligence to generate an answer that is responsive to a prompt that is received by the artificial intelligence model. The artificial intelligence model may be an artificial general intelligence model. An artificial general intelligence model is an artificial intelligence model (e.g., an autono- mous artificial intelligence model) that is configured to be capable of performing any task that an animal (e.g., a human) is capable of performing. In an example implemen- tation, the artificial general intelligence model is capable of performing a task that surpasses the capabilities of an animal. Artificial intelligence is intelligence of a machine (e.g., a processing system) and/or code (e.g., software and/or firmware), as opposed to intelligence of an animal (e.g., a human).

Example techniques described herein have a variety of benefits as compared to conventional techniques for using artificial intelligence to generate an answer that is responsive to an artificial intelligence prompt. For instance, the example techniques are capable of controlling and/or visualizing context of an artificial intelligence prompt. The example techniques may reduce an amount of time and/or resources (e.g., processor cycles, memory, network bandwidth) that is consumed to generate an adequate answer to a prompt. For instance, if an answer that is generated by an artificial intelligence model is deemed inadequate (e.g., not suffi- ciently accurate, precise, or relevant) by a user, the user may provide additional prompt(s) to the artificial intelligence model in hopes that the artificial intelligence model will generate an answer that is deemed adequate by the user. By visualizing and/or controlling the contextual information associated with a prompt, the time and resources that would have been consumed to process additional prompts and/or to identify and manually change a scope of the contextual information may be avoided. By reducing the amount of time and/or resources that is consumed by a computing system that uses the artificial intelligence model, the effi- ciency of the computing system may be increased.

The example techniques may increase a user experience of a user who uses an artificial intelligence model by enabling the user to view contextual information associated with a prompt and/or to control the contextual information. For instance, the user may delete or remove at least a portion (e.g., all) of the contextual information or incorporate addi- tional information into the contextual information. The example technique may increase the user experience of the user by automatically controlling the contextual information regarding the prompt. Controlling the contextual informa- tion may cause the artificial intelligence model to generate a more accurate, precise, or relevant answer. The example techniques may increase an efficiency of the user by reduc- ing an amount of time that the user would otherwise con- sume to generate subsequent prompt(s) and/or identify and manually change a scope of the contextual information associated with the prompt in an effort to obtain a more accurate, precise, or relevant answer from the artificial intelligence model.

FIG. 1 is a block diagram of an example context process- ing system 100 in accordance with an embodiment. Gener- ally speaking, the context processing system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the context processing system 100 controls and/or visualizes context of an artificial intelligence prompt. Detail regarding techniques for controlling and/or visualizing context of an artificial intelligence prompt is provided in the following discussion.

As shown in FIG. 1, the context processing system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; App-Code® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force-.com® platform developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include context processing logic 108 for illustrative purposes. The context processing logic 108 is configured to control and/or visualize context of an artificial intelligence prompt. In a first example implementation, the context processing logic 108 detects a user-generated prompt for providing as an input to an artificial intelligence model. The context processing logic 108 identifies contextual information that is not included in the user-generated prompt. The contextual information includes context regarding the user-generated prompt. The contextual information is for providing together with the user-generated prompt to the artificial intelligence model to provide the context to the artificial intelligence model. The context processing logic 108 generates a visual representation of the contextual information. Based at least on (e.g., as a result of or in response to) detection of a user-generated presentation instruction, the context processing logic 108 triggers presentation of the visual representation of the contextual information via a user interface.

In a second example implementation, the context processing logic 108 detects a current user-generated prompt that is included in a prompt chain. The prompt chain includes a series of related prompts that are for providing as successive inputs to an artificial intelligence model such that a context regarding each related prompt in the series is included in a context regarding a next successive related prompt in the series. The context processing logic 108 determines that an initial scope of contextual information, which includes context regarding the current user-generated prompt, includes previous contextual information, which includes context regarding a previous user-generated prompt in the prompt chain. The contextual information is not included in the current user-generated prompt. The contextual information is for providing together with the current user-generated prompt to the artificial intelligence model to provide the context to the artificial intelligence model. The context processing logic 108 automatically changes the initial scope of the contextual information to provide a changed scope that does not include at least a portion of the previous contextual information. The context processing logic 108 causes the artificial intelligence model to generate an answer to the current user-generated prompt that is based on (e.g., based at least on) the changed scope of the contextual information in lieu of the initial scope of the contextual information by providing the current user-generated prompt together with the contextual information having the changed scope in lieu of the initial scope as inputs to the artificial intelligence model.

The context processing logic 108 may be implemented in various ways to control and/or visualize context of an artificial intelligence prompt, including being implemented in hardware, software, firmware, or any combination thereof. For example, the context processing logic 108 may be implemented as computer program code configured to be executed in one or more processors. In another example, at least a portion of the context processing logic 108 may be implemented as hardware logic/electrical circuitry. For instance, at least a portion of the context processing logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the context processing logic 108 may be (or may be included in) a developer tool and/or a cloud computing program, though the scope of the example embodiments is not limited in this respect.

The context processing logic 108 is shown to be incorporated in the first server(s) 106A for illustrative purposes and is not intended to be limiting. It will be recognized that the context processing logic 108 (or any portion(s) thereof) may be incorporated in any one or more of the servers 106A-106N, any one or more of the user devices 102A-102M, or any combination thereof. For example, client-side aspects of the context processing logic 108 may be incorporated in one or more of the user devices 102A-102M, and server-side aspects of context processing logic 108 may be incorporated in one or more of the servers 106A-106N.

FIG. 2 depicts a flowchart 200 of an example method for visualizing context of an artificial intelligence prompt in accordance with an embodiment. Flowchart 200 may be performed by the first server(s) 106A shown in FIG. 1, for example. For illustrative purposes, flowchart 200 is described with respect to a computing system 300 shown in FIG. 3, which is an example implementation of the first server(s) 106A. As shown in FIG. 3, the computing system 300 includes context processing logic 308. The context processing logic 308 includes prompt determination logic 312, context identification logic 314, presentation logic 316, control logic 318, and an artificial intelligence model 320. Further structural and operational embodiments will be apparent to persons skilled in the relevant art(s) based on the discussion regarding flowchart 200.

As shown in FIG. 2, the method of flowchart 200 begins at step 202. In step 202, a user-generated prompt for providing as an input to an artificial intelligence model, is detected. In an example implementation, the prompt determination logic 312 detects a user-generated prompt 322 for providing as an input to the artificial intelligence model 320. In accordance with this implementation, the prompt determination logic 312 generates prompt information 330 to indicate (e.g., specify or describe) the user-generated prompt 322. For instance, the prompt information 330 may include text (e.g., an entirety of the text) from the user-generated prompt 322.

In an example embodiment, the artificial intelligence model is a large language model (LLM). In accordance with this embodiment, the user-generated prompt serves as an input to the LLM.

At step 204, contextual information that is not included in the user-generated prompt is identified. The contextual information includes context regarding the user-generated prompt. The contextual information is for providing together with the user-generated prompt to the artificial intelligence model to provide the context to the artificial intelligence model. In an example implementation, the context identification logic 314 identifies contextual information 324, which is not included in the user-generated prompt 322. For instance, the context identification logic 314 may identify the contextual information 324 based at least on the prompt information 330. The contextual information 324 includes context regarding the user-generated prompt 322. The contextual information 324 is for providing together with the user-generated prompt 322 to the artificial intelligence model 320 to provide the context to the artificial intelligence model 320.

At step 206, a visual representation of the contextual information is generated. For instance, the visual representation may include text from the contextual information, a summary of the text, annotations to the text, coloring of the text (e.g., colors indicating respective types of text), pictures, shapes, and so on. The visual representation may indicate relationships between portions of the contextual information. For example, the visual representation may depict categories and indicate portions of the contextual information that are categorized into the respective categories. Examples of a category include but are not limited to a source (or a type of source) from which information is received, a type of data, and a topic. In an example implementation, the contextual identification logic 314 generates a visual representation 332 of the contextual information 324.

At step 208, based at least on detection of a user-generated presentation instruction, presentation of the visual representation of the contextual information via a user interface is triggered. For instance, the presentation of the visual representation may be performed in real-time (e.g., on-demand) in response to the user-generated presentation instruction. In an aspect, triggering the presentation of the visual representation of the contextual information at step 208 reduces an amount of time and/or resources (e.g., processor cycles, memory, network bandwidth) that is consumed by a computing system (e.g., computing system 300) to generate an adequate (e.g., useful, accurate, or precise) answer to the user-generated prompt, for example, by reducing a number of follow-up prompts that are processed by the artificial intelligence model to generate the adequate answer. For instance, no follow-up prompts may be necessary. In accordance with this aspect, triggering the presentation of the visual representation of the contextual information at step 208 may enable a user to modify the scope of the contextual information prior to the user-generated prompt and the contextual information being presented to the artificial intelligence model for processing. In an example implementation, based at least on detection of a user-generated presentation instruction 328, the presentation logic 316 triggers presentation of the visual representation 332 of the contextual information 324 via a user interface.

In an example implementation, the user-generated presentation instruction includes a gesture. A gesture may be a touch gesture (e.g., touchpad gesture or touchscreen gesture), a hover gesture, or a combination thereof. A touch gesture is a gesture in which a user touches a touchpad or a touchscreen of a computing system. Examples of a touch gesture include but are not limited to a tap, a double tap, a long press, a pan, a flick, a pinch, a zoom, a rotate, a scroll or swipe, a two-finger tap, and a two-finger scroll. A hover gesture is a gesture that does not require a user to touch a touchpad or a touchscreen of a computing system. For instance, the user may perform the hover gesture by placing a hand and/or finger(s) at a spaced distance above a touchscreen. It will be recognized that the touchscreen can detect that the user's hand and/or finger(s) are proximate to the touchscreen (e.g., through capacitive sensing). Additionally, hand rotation and finger movement can be detected while the hand and/or finger(s) are hovering. Examples of a hover gesture include but are not limited to finger hover pan (e.g., float a finger above a screen and pan the finger in any direction); a finger hover flick (e.g., float a finger above the screen and quickly flick the finger); a finger hover circle (e.g., float a finger above the screen and draw a circle or counter-circle in the air); a finger hover hold (e.g., float a finger above the screen and keep the finger stationary); a palm swipe (e.g., float the edge of the hand or the palm of the hand and swipe across the screen); an air pinch/lift/drop (e.g., use the thumb and pointing finger to perform a pinch gesture above the screen, a drag motion, then a release motion); and a hand wave gesture (e.g., float the hand above the screen and move the hand back and forth in a hand-waving motion). It will be recognized that gestures may be detected in other ways, such as using a camera. In such instances, the user need not necessarily perform a hover gesture in proximity to a touchscreen. Rather, the user may perform the gesture in a field of view of a camera to enable the camera to detect the gesture. In an example implementation, presentation logic 316 detects the gesture.

In an example embodiment, the user-generated prompt, which is detected at step 202, is for providing as the input to the artificial intelligence model in a context of a developer tool. In accordance with this embodiment, the contextual information, which is identified at step 204, is usable by the artificial intelligence model to implement functionality associated with the developer tool. For example, the contextual information or a portion thereof may be provided to the artificial intelligence model via a web service interface. In another example, the contextual information or a portion thereof may be extracted from a corpus of knowledge based on a calculated relevance of the contextual information or the portion thereof to one or more attributes (e.g., tokens) of the user-generated prompt.

In an example implementation of this embodiment, the user-generated prompt requests for a method that is written in C++ to be converted into a singleton. In accordance with this implementation, the contextual information includes other methods and singletons that were generated from those methods. In further accordance with this implementation, the artificial intelligence model uses the other methods and their corresponding singletons to implement functionality of the developer tool that converts the method identified in the user-generated prompt into a singleton.

In another example implementation, the user-generated prompt requests for documentation of functions to be synthesized when no comments regarding the documentation are available. In accordance with this implementation, the contextual information includes the documentation. In further accordance with this implementation, the artificial intelligence model uses the documentation to implement functionality of the developer tool that generates comments regarding the documentation.

In yet another example implementation, the user-generated prompt requests for unformatted code (e.g., an unformatted software function) to be semantically formatted. In accordance with this implementation, the contextual information includes the unformatted code. In further accordance with this implementation, the artificial intelligence model uses the unformatted code to implement functionality of the developer tool that semantically formats the unformatted code.

In still another example implementation, the user-generated prompt requests for code to be generated from natural language text. In accordance with this implementation, the contextual information includes the natural language text. In further accordance with this implementation, the artificial intelligence model uses the natural language text to implement functionality of the developer tool that generates the code.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes providing a scoping interface element in the user interface. The scoping interface element enables a user of the artificial intelligence model to change a scope of the contextual information. For example, the scoping interface element may depict visual representations of documents that are available for inclusion in the contextual information. In accordance with this example, each of the visual representations may be selectable to indicate that the respective document is to be included in the contextual information and de-selectable to indicate that the respective document is not to be included in the contextual information. In another example, the scoping interface element may depict visual representations of respective categories of information that are available for inclusion in the contextual information. In accordance with this example, each of the visual representations may be selectable to indicate that information categorized in the respective category is to be included in the contextual information and de-selectable to indicate that information categorized in the respective category is not to be included in the contextual information. In an example implementation, the presentation logic 316 provides a scoping interface element 336 in the user interface. The scoping interface element 336 enables a user of the artificial intelligence model 320 to change a scope of the contextual information 324.

In an aspect of this embodiment, the method of flowchart 200 further includes providing selectable interface elements in the scoping interface element. The selectable interface elements represent categories of information that are available for inclusion in the contextual information. For example, the categories represented by the selectable interface elements may be identified by the artificial intelligence model as having a relevance to the user-generated prompt that satisfies a criterion. In accordance with this example, the artificial intelligence model may identify the categories based on the relevance of the categories being greater than or equal to a relevance threshold. In an example implementation, the presentation logic 316 provides selectable interface elements 338 in the scoping interface element 336. The selectable interface elements 338 represent categories of information that are available for inclusion in the contextual information 324. In accordance with this aspect, the method of flowchart 200 further includes limiting the scope of the contextual information to a subset of the categories based on a subset of the selectable interface elements, which represents the subset of the categories, being selected in the scoping interface element. In an example implementation, context identification logic 314 limits the scope of the contextual information 324 to a subset of the categories based on a subset of the selectable interface elements 338, which represents the subset of the categories, being selected in the scoping interface element 336. In accordance with this implementation, the context identification logic 314 receives element selection information 334 in response to the presentation logic 316 providing the selectable interface elements 338 in the scoping interface element 336. The element selection information 334 indicates the subset of the selectable interface elements 338 that is selected in the scoping interface element 336. In further accordance with this implementation, the context identification logic 314 limits the scope of the contextual information 324 to the subset of the categories based on receipt of the element selection information 334 (e.g., based on the element selection information 334 indicating the subset of the selectable interface elements 338 that is selected).

In another example embodiment, the method of flowchart 200 further includes causing the artificial intelligence model to generate an answer to the user-generated prompt that is based on the contextual information by providing the user-generated prompt and the contextual information to the artificial intelligence model. In an example implementation, the control logic 318 causes the artificial intelligence model 320 to generate an answer 340 to the user-generated prompt 322 that is based on the contextual information 324 by providing the user-generated prompt 322 and the contextual information 324 to the artificial intelligence model 320.

It will be recognized that the computing system 300 may not include one or more of the context processing logic 308, the prompt determination logic 312, the context identification logic 314, the presentation logic 316, the control logic 318, and/or the artificial intelligence model 320. Furthermore, the computing system 300 may include components in addition to or in lieu of the context processing logic 308, the prompt determination logic 312, the context identification logic 314, the presentation logic 316, the control logic 318, and/or the artificial intelligence model 320.

FIG. 4 depicts a flowchart 400 of an example method for automatically controlling context of an artificial intelligence prompt in accordance with an embodiment. Flowchart 400 may be performed by the first server(s) 106A shown in FIG. 1, for example. For illustrative purposes, flowchart 400 is described with respect to a computing system 500 shown in FIG. 5, which is an example implementation of the first server(s) 106A. As shown in FIG. 5, the computing system 500 includes context processing logic 508. The context processing logic 508 includes prompt determination logic 512, scope determination logic 514, scope change logic 516, control logic 518, and an artificial intelligence model 520. Further structural and operational embodiments will be apparent to persons skilled in the relevant art(s) based on the discussion regarding flowchart 400.

As shown in FIG. 4, the method of flowchart 400 begins at step 402. In step 402, a current user-generated prompt that is included in a prompt chain is detected. The prompt chain includes a series of related prompts that are for providing as successive inputs to an artificial intelligence model such that a context regarding each related prompt in the series is included in a context regarding a next successive related prompt in the series. In an example implementation, the prompt determination logic 512 detects a current user-generated prompt 522 that is included in a prompt chain 550. The prompt chain 550 includes a series of related prompts that are for providing as successive inputs to the artificial intelligence model 520 such that a context regarding each related prompt in the series is included in a context regarding a next successive related prompt in the series. In accordance with this implementation, the prompt determination logic 512 generates prompt information 530 to indicate (e.g., specify or describe) the current user-generated prompt 522. For instance, the prompt information 530 may include text (e.g., an entirety of the text) from the current user-generated prompt 522.

At step 404, a determination is made that an initial scope of contextual information, which includes context regarding the current user-generated prompt, includes previous contextual information, which includes context regarding a previous user-generated prompt in the prompt chain. The contextual information is not included in the current user-generated prompt. The contextual information is for providing together with the current user-generated prompt to the artificial intelligence model to provide the context to the artificial intelligence model. In an example implementation, the scope determination logic 514 determines that an initial scope of contextual information 524, which includes context regarding the current user-generated prompt 522, includes previous contextual information, which includes context regarding a previous user-generated prompt 548 in the prompt chain 550. In an aspect, the scope determination logic 514 identifies the contextual information 524 based at least on the prompt information 530. In another aspect, the scope determination logic 514 analyzes the contextual information 524 to determine the initial scope of the contextual information 524. In accordance with this aspect, the scope determination logic 514 compares the contextual information 524 and the previous contextual information to determine that the contextual information 524 includes the previous contextual information. In accordance with this implementation, the scope determination logic 514 generates initial scope information 542, which indicates the initial scope of the contextual information 524.

At step 406, the initial scope of the contextual information is automatically changed to provide a changed scope that does not include at least a portion of the previous contextual information. In an aspect, automatically changing the initial scope of the contextual information to provide the changed scope at step 406 reduces an amount of time and/or resources (e.g., processor cycles, memory, network bandwidth) that is consumed by a computing system (e.g., computing system 500) to generate an adequate (e.g., useful, accurate, or precise) answer to the current user-generated prompt, for example, by reducing a number of follow-up prompts that are processed by the artificial intelligence model to generate the adequate answer. For instance, no follow-up prompts may be necessary. In an example implementation, the scope change logic 516 automatically changes the initial scope of the contextual information 524 to provide a changed scope that does not include at least a portion of the previous contextual information. In an aspect, the scope change logic 516 removes at least a portion of the previous contextual information form the contextual information 524. In accordance with this implementation, the scope change logic 516 generates changed scope information 544, which indicates the changed scope of the contextual information 524.

In an example embodiment, automatically changing the initial scope of the contextual information at step 406 includes adding supplemental information to the initial scope to provide the changed scope of the contextual information. For instance, adding the supplemental information to the initial scope may include replacing at least some of the portion of the previous contextual information with at least a portion of the supplemental information to provide the changed scope of the contextual information.

In another example embodiment, automatically changing the initial scope of the contextual information at step 406 includes defining the changed scope of the contextual information to not include the previous contextual information. For instance, defining the changed scope of the contextual information to not include the previous contextual information may be performed in accordance with a pre-defined policy (e.g., a policy defined before an answer to the previous user-generated prompt was generated by the artificial intelligence model).

In yet another example embodiment, automatically changing the initial scope of the contextual information at step 406 includes defining the changed scope of the contextual information to include a previous answer, which was generated by the artificial intelligence model as a response to the previous user-generated prompt.

At step 408, the artificial intelligence model is caused to generate an answer to the current user-generated prompt that is based on (e.g., based at least on) the changed scope of the contextual information in lieu of the initial scope of the contextual information by providing the current user-generated prompt together with the contextual information having the changed scope in lieu of the initial scope as inputs to the artificial intelligence model. In an example implementation, the control logic 518 causes the artificial intelligence model 520 to generate an answer 540 to the current user-generated prompt 522 that is based on the changed scope of the contextual information 524, as indicated by the changed scope information 544, in lieu of the initial scope of the contextual information 524 by providing the current user-generated prompt 522 together with updated contextual information 546 as inputs to the artificial intelligence model 550. The updated contextual information 546 is an updated version of the contextual information 524 in which the contextual information 524 has been updated to have the changed scope in lieu of the initial scope.

In an example embodiment, causing the artificial intelligence model to generate the answer to the current user-generated prompt at step 408 includes delaying the artificial intelligence model from processing of the current user-generated prompt until the initial scope of the contextual information is changed to provide the changed scope of the contextual information.

In an example embodiment, the artificial intelligence model is a large language model.

In another example embodiment, the series of related prompts are for providing as successive inputs to the artificial intelligence model in a context of a developer tool. In accordance with this embodiment, the contextual information is usable by the AI model to implement functionality associated with the developer tool. In an aspect of this embodiment, the current user-generated prompt, which is detected at step 402, includes an inquiry regarding a software function. In accordance with this aspect, the changed scope of the contextual information includes the software function.

In some example embodiments, one or more steps 402, 404, 406, and/or 408 of flowchart 400 may not be performed. Moreover, steps in addition to or in lieu of steps 402, 404, 406, and/or 408 may be performed.

It will be recognized that the computing system 500 may not include one or more of the context processing logic 508, the prompt determination logic 512, the scope determination logic 514, the scope change logic 516, the control logic 518, and/or the artificial intelligence model 520. Furthermore, the computing system 500 may include components in addition to or in lieu of the context processing logic 508, the prompt determination logic 512, the scope determination logic 514, the scope change logic 516, the control logic 518, and/or the artificial intelligence model 520.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the context processing logic 108, the context processing logic 308, the prompt determination logic 312, the context identification logic 314, the presentation logic 316, the control logic 318, the artificial intelligence model 320, the context processing logic 508, the prompt determination logic 512, the scope determination logic 514, the scope change logic 516, the control logic 518, the artificial intelligence model 520, flowchart 200, and/or flowchart 400 may be implemented in hardware, software, firmware, or any combination thereof.

For example, any one or more of the context processing logic 108, the context processing logic 308, the prompt determination logic 312, the context identification logic 314, the presentation logic 316, the control logic 318, the artificial intelligence model 320, the context processing logic 508, the prompt determination logic 512, the scope determination logic 514, the scope change logic 516, the control logic 518, the artificial intelligence model 520, flowchart 200, and/or flowchart 400 may be implemented, at least in part, as computer program code configured to be executed in one or more processors.

In another example, any one or more of the context processing logic 108, the context processing logic 308, the prompt determination logic 312, the context identification logic 314, the presentation logic 316, the control logic 318, the artificial intelligence model 320, the context processing logic 508, the prompt determination logic 512, the scope determination logic 514, the scope change logic 516, the control logic 518, the artificial intelligence model 520, flowchart 200, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
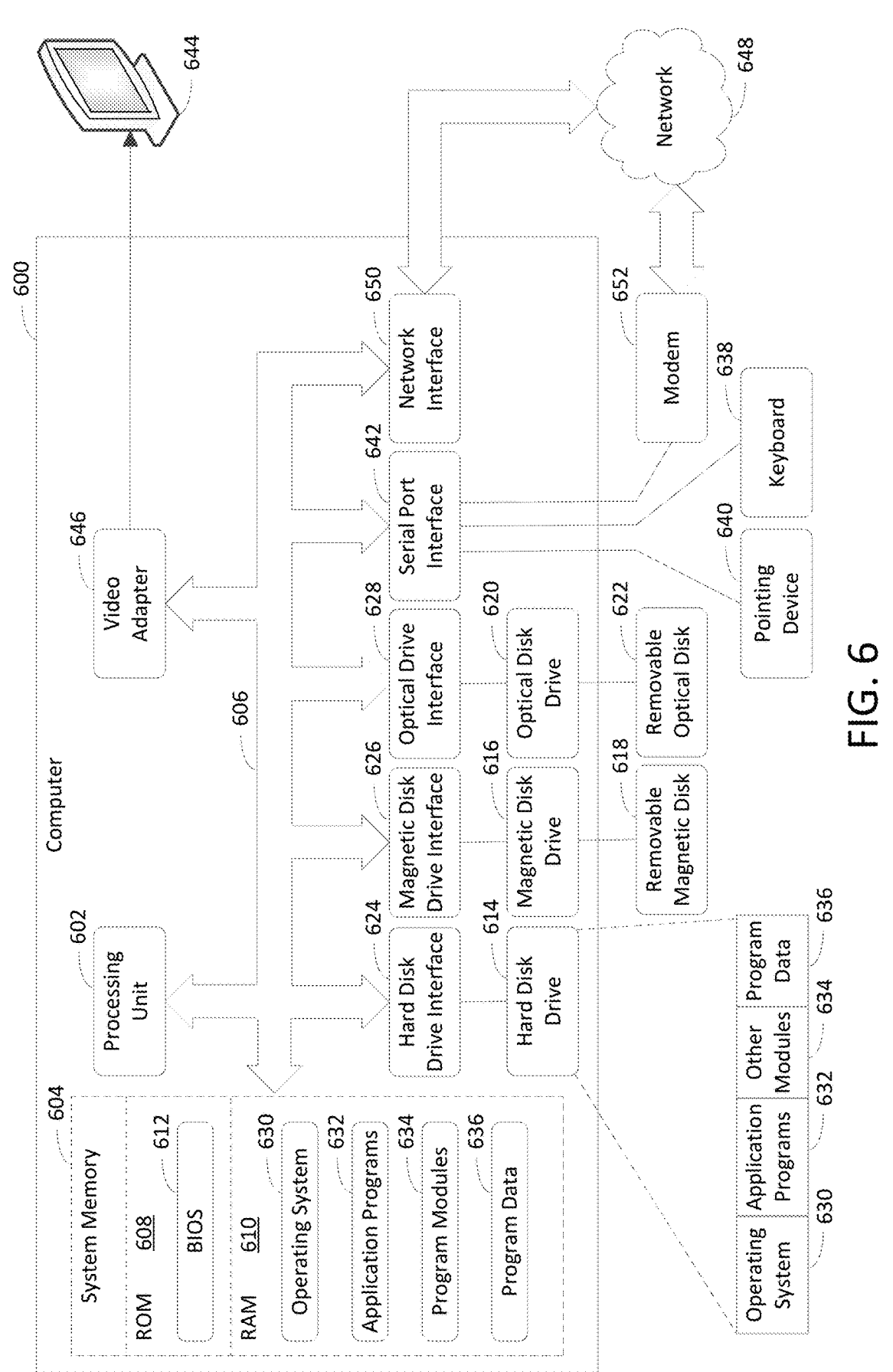
FIG. 6 depicts an example computer in which embodi- ments may be implemented.

II. Further Discussion of Some Example Embodiments (A1) A first example system (FIG. 1, 102A-102M, 106A-106N; FIG. 3, 300; FIG. 6, 600) comprises a processor system (FIG. 6, 602) and a memory (FIG. 6, 604, 608, 610) that stores computer-executable instructions. The computer-executable instructions are executable by the processor system to detect (FIG. 2, 202) a user-generated prompt (FIG. 3, 322) for providing as an input to an artificial intelligence model (FIG. 3, 320). The computer-executable instructions are executable by the processor system further to identify (FIG. 2, 204) contextual information (FIG. 3, 324) that is not included in the user-generated prompt. The contextual information includes context regarding the user-generated prompt. The contextual information is for providing together with the user-generated prompt to the artificial intelligence model to provide the context to the artificial intelligence model. The computer-executable instructions are executable by the processor system further to generate (FIG. 2, 206) a visual representation (FIG. 3, 332) of the contextual information. The computer-executable instructions are executable by the processor system further to, based at least on detection of a user-generated presentation instruction (FIG. 3, 328), trigger (FIG. 2, 208) presentation of the visual representation of the contextual information via a user interface.

(A2) In the example system of A1, wherein the artificial intelligence model is a large language model.

(A3) In the example system of any of A1-A2, wherein the user-generated prompt is for providing as the input to the artificial intelligence model in a context of a developer tool; and wherein the contextual information is usable by the AI model to implement functionality associated with the developer tool.

(A4) In the example system of any of A1-A3, wherein the user-generated prompt includes an inquiry regarding a software function; and wherein the contextual information includes the software function.

(A5) In the example system of any of A1-A4, wherein the user-generated presentation instruction includes a gesture.

(A6) In the example system of any of A1-A5, wherein the computer-executable instructions are executable by the processor system further to: provide a scoping interface element in the user interface, the scoping interface element enabling a user of the artificial intelligence model to change a scope of the contextual information.

(A7) In the example system of any of A1-A6, wherein the computer-executable instructions are executable by the processor system further to: provide a plurality of selectable interface elements in the scoping interface element, the plurality of selectable interface elements representing a plurality of categories; and limit the scope of the contextual information to a subset of the plurality of categories based on a subset of the plurality of selectable interface elements, which represents the subset of the plurality of categories, being selected in the scoping interface element.

(A8) In the example system of any of A1-A7, wherein the computer-executable instructions are executable by the processor system further to: cause the artificial intelligence model to generate an answer to the user-generated prompt that is based on the contextual information by providing the user-generated prompt and the contextual information to the artificial intelligence model.

(B1) A second example system (FIG. 1, 102A-102M, 106A-106N; FIG. 5, 500; FIG. 6, 600) comprises a processor system (FIG. 6, 602) and a memory (FIG. 6, 604, 608, 610) that stores computer-executable instructions. The computer-executable instructions are executable by the processor system to detect (FIG. 4, 402) a current user-generated prompt (FIG. 5, 522) that is included in a prompt chain (FIG. 5, 550). The prompt chain includes a series of related prompts that are for providing as successive inputs to an artificial intelligence model (FIG. 5, 520) such that a context regarding each related prompt in the series is included in a context regarding a next successive related prompt in the series. The computer-executable instructions are executable by the processor system further to determine (FIG. 4, 404) that an initial scope of contextual information (FIG. 5, 524), which includes context regarding the current user-generated prompt, includes previous contextual information, which includes context regarding a previous user-generated prompt (FIG. 5, 548) in the prompt chain. The contextual information is not included in the current user-generated prompt. The contextual information is for providing together with the current user-generated prompt to the artificial intelligence model to provide the context to the artificial intelligence model. The computer-executable instructions are executable by the processor system further to automatically change (FIG. 4, 406) the initial scope of the contextual information to provide a changed scope that does not include at least a portion of the previous contextual information. The computer-executable instructions are executable by the processor system further to cause (FIG. 4, 408) the artificial intelligence model to generate an answer (FIG. 5, 540) to the current user-generated prompt that is based on the changed scope of the contextual information in lieu of the initial scope of the contextual information by providing the current user-generated prompt together with the contextual information having the changed scope in lieu of the initial scope as inputs to the artificial intelligence model.

(B2) In the example system of B1, wherein the artificial intelligence model is a large language model.

(B3) In the example system of any of B1-B2, wherein the series of related prompts are for providing as successive inputs to the artificial intelligence model in a context of a developer tool; and wherein the contextual information is usable by the AI model to implement functionality associated with the developer tool.

(B4) In the example system of any of B1-B3, wherein the current user-generated prompt includes an inquiry regarding a software function; and wherein the changed scope of the contextual information includes the software function.

(B5) In the example system of any of B1-B4, wherein the computer-executable instructions are executable by the processor system to: add supplemental information to the initial scope to provide the changed scope of the contextual information.

(B6) In the example system of any of B1-B5, wherein the computer-executable instructions are executable by the processor system to: delay the artificial intelligence model from processing of the current user-generated prompt until the initial scope of the contextual information is changed to provide the changed scope of the contextual information.

(B7) In the example system of any of B1-B6, wherein the computer-executable instructions are executable by the processor system to: define the changed scope of the contextual information to not include the previous contextual information.

(B8) In the example system of any of B1-B7, wherein the computer-executable instructions are executable by the processor system to: define the changed scope of the contextual information to include a previous answer, which was generated by the artificial intelligence model as a response to the previous user-generated prompt.

(C1) A first example method is implemented by a computing system (FIG. 1, 102A-102M, 106A-106N; FIG. 3, 300; FIG. 6, 600). The method comprises detecting (FIG. 2, 202) a user-generated prompt (FIG. 3, 322) for providing as an input to an artificial intelligence model (FIG. 3, 320). The method further comprises identifying (FIG. 2, 204) contextual information (FIG. 3, 324), that is not included in the user-generated prompt. The contextual information includes context regarding the user-generated prompt. The contextual information is for providing together with the user-generated prompt to the artificial intelligence model to provide the context to the artificial intelligence model. The method further comprises generating (FIG. 2, 206) a visual representation (FIG. 3, 332) of the contextual information. The method further comprises, based at least on detection of a user-generated presentation instruction (FIG. 3, 328), triggering (FIG. 2, 208) presentation of the visual representation of the contextual information via a user interface.

(C2) In the example method of C1, wherein the artificial intelligence model is a large language model.

(C3) In the example method of any of C1-C2, wherein the user-generated prompt is for providing as the input to the artificial intelligence model in a context of a developer tool; and wherein the contextual information is usable by the AI model to implement functionality associated with the developer tool.

(C4) In the example method of any of C1-C3, wherein the user-generated prompt includes an inquiry regarding a software function; and wherein the contextual information includes the software function.

(C5) In the example method of any of C1-C4, wherein the user-generated presentation instruction includes a gesture.

(C6) In the example method of any of C1-C5, further comprising: providing a scoping interface element in the user interface, the scoping interface element enabling a user of the artificial intelligence model to change a scope of the contextual information.

(C7) In the example method of any of C1-C6, further comprising: providing a plurality of selectable interface elements in the scoping interface element, the plurality of selectable interface elements representing a plurality of categories; and limiting the scope of the contextual information to a subset of the plurality of categories based on a subset of the plurality of selectable interface elements, which represents the subset of the plurality of categories, being selected in the scoping interface element.

(C8) In the example method of any of C1-C7, further comprising: causing the artificial intelligence model to generate an answer to the user-generated prompt that is based on the contextual information by providing the user-generated prompt and the contextual information to the artificial intelligence model.

(D1) A second example method is implemented by a computing system (FIG. 1, 102A-102M, 106A-106N; FIG. 5, 500; FIG. 6, 600). The method comprises detecting (FIG. 4, 402) a current user-generated prompt (FIG. 5, 522) that is included in a prompt chain (FIG. 5, 550). The prompt chain includes a series of related prompts that are for providing as successive inputs to an artificial intelligence model (FIG. 5, 520) such that a context regarding each related prompt in the series is included in a context regarding a next successive related prompt in the series. The method further comprises determining (FIG. 4, 404) that an initial scope of contextual information (FIG. 5, 524), which includes context regarding the current user-generated prompt, includes previous contextual information, which includes context regarding a previous user-generated prompt (FIG. 5, 548) in the prompt chain. The contextual information is not included in the current user-generated prompt. The contextual information is for providing together with the current user-generated prompt to the artificial intelligence model to provide the context to the artificial intelligence model. The method further comprises automatically changing (FIG. 4, 406) the initial scope of the contextual information to provide a changed scope that does not include at least a portion of the previous contextual information. The method further comprises causing (FIG. 4, 408) the artificial intelligence model to generate an answer (FIG. 5, 540) to the current user-generated prompt that is based on the changed scope of the contextual information in lieu of the initial scope of the contextual information by providing the current user-generated prompt together with the contextual information having the changed scope in lieu of the initial scope as inputs to the artificial intelligence model.

(D2) In the example method of D1, wherein the artificial intelligence model is a large language model.

(D3) In the example method of any of D1-D2, wherein the series of related prompts are for providing as successive inputs to the artificial intelligence model in a context of a developer tool; and wherein the contextual information is usable by the AI model to implement functionality associated with the developer tool.

(D4) In the example method of any of D1-D3, wherein the current user-generated prompt includes an inquiry regarding a software function; and wherein the changed scope of the contextual information includes the software function.

(D5) In the example method of any of D1-D4, wherein automatically changing the initial scope of the contextual information comprises: adding supplemental information to the initial scope to provide the changed scope of the contextual information.

(D6) In the example method of any of D1-D5, wherein causing the artificial intelligence model to generate the answer to the current user-generated prompt comprises: delaying the artificial intelligence model from processing of the current user-generated prompt until the initial scope of the contextual information is changed to provide the changed scope of the contextual information.

(D7) In the example method of any of D1-D6, wherein automatically changing the initial scope of the contextual information comprises: defining the changed scope of the contextual information to not include the previous contextual information.

(D8) In the example method of any of D1-D7, wherein automatically changing the initial scope of the contextual information comprises: defining the changed scope of the contextual information to include a previous answer, which was generated by the artificial intelligence model as a response to the previous user-generated prompt.

(E1) A first example computer program product (FIG. 6, 618, 622) comprising a computer-readable storage medium having instructions recorded thereon for enabling a processor-based system (FIG. 1, 102A-102M, 106A-106N; FIG. 3, 300; FIG. 6, 600) to perform operations. The operations comprise detecting (FIG. 2, 202) a user-generated prompt (FIG. 3, 322) for providing as an input to an artificial intelligence model (FIG. 3, 320). The operations further comprise identifying (FIG. 2, 204) contextual information (FIG. 3, 324) that is not included in the user-generated prompt. The contextual information includes context regarding the user-generated prompt. The contextual information is for providing together with the user-generated prompt to the artificial intelligence model to provide the context to the artificial intelligence model. The operations further comprise generating (FIG. 2, 206) a visual representation (FIG. 3, 332) of the contextual information. The operations further comprise, based at least on detection of a user-generated presentation instruction (FIG. 3, 328), triggering (FIG. 2, 208) presentation of the visual representation of the contextual information via a user interface.

(F1) A second example computer program product (FIG. 6, 618, 622) comprising a computer-readable storage medium having instructions recorded thereon for enabling a processor-based system (FIG. 1, 102A-102M, 106A-106N; FIG. 5, 500; FIG. 6, 600) to perform operations. The operations comprise detecting (FIG. 4, 402) a current user-generated prompt (FIG. 5, 522) that is included in a prompt chain (FIG. 5, 550). The prompt chain includes a series of related prompts that are for providing as successive inputs to an artificial intelligence model (FIG. 5, 520) such that a context regarding each related prompt in the series is included in a context regarding a next successive related prompt in the series. The operations further comprise determining (FIG. 4, 404) that an initial scope of contextual information (FIG. 5, 524), which includes context regarding the current user-generated prompt, includes previous contextual information, which includes context regarding a previous user-generated prompt (FIG. 5, 548) in the prompt chain. The contextual information is not included in the current user-generated prompt. The contextual information is for providing together with the current user-generated prompt to the artificial intelligence model to provide the context to the artificial intelligence model. The operations further comprise automatically changing (FIG. 4, 406) the initial scope of the contextual information to provide a changed scope that does not include at least a portion of the previous contextual information. The operations further comprise causing (FIG. 4, 408) the artificial intelligence model to generate an answer (FIG. 5, 540) to the current user-generated prompt that is based on the changed scope of the contextual information in lieu of the initial scope of the contextual information by providing the current user-generated prompt together with the contextual information having the changed scope in lieu of the initial scope as inputs to the artificial intelligence model.

III. Example Computer System

FIG. 6 depicts an example computer 600 in which embodiments may be implemented. Any one or more of the user devices 102A-102M and/or any one or more of the servers 106A-106N shown in FIG. 1, the computing system 300 shown in FIG. 3, and/or the computing system 500 shown in FIG. 5 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the context processing logic 108, the context processing logic 308, the prompt determination logic 312, the context identification logic 314, the presentation logic 316, the control logic 318, the artificial intelligence model 320, the context processing logic 508, the prompt determination logic 512, the scope determination logic 514, the scope change logic 516, the control logic 518, the artificial intelligence model 520, flowchart 200 (including any step of flowchart 200), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a processor system; and
a memory that stores computer-executable instructions that are executable by the processor system to at least:
   detect, by prompt determination logic, a user-generated prompt for providing as an input to an artificial intelligence model;
   identify, by context identification logic, contextual information that is not included in the user-generated prompt, the contextual information for providing together with the user-generated prompt to the artificial intelligence model;
   generate, by presentation logic, a visual representation of the contextual information;
   based at least on presentation logic detecting a user-generated presentation instruction, trigger, by the presentation logic, presentation of the visual representation of the contextual information via a user interface;
   prior to control logic presenting the user-generated prompt and the contextual information to the artificial intelligence model, determine, by the control logic, that a scope of the contextual information is modified in accordance with a user action, which results from the presentation logic triggering presentation of the visual representation of the contextual information via the user interface, to provide a modified scope; and
   in response to the control logic determining that the scope of the contextual information is modified, cause, by the control logic, the artificial intelligence model to generate an answer to the user-generated prompt that is based on the contextual information having the modified scope by providing the user-generated prompt and the contextual information having the modified scope as inputs to the artificial intelligence model.

2. The system of claim 1, wherein the artificial intelligence model is a large language model.

3. The system of claim 1, wherein the user-generated prompt is for providing as the input to the artificial intelligence model in a context of a developer tool; and
   wherein the contextual information is usable by the AI model to implement functionality associated with the developer tool.

4. The system of claim 3, wherein the user-generated prompt includes an inquiry regarding a software function; and wherein the contextual information includes the software function.

5. The system of claim 1, wherein the user-generated presentation instruction includes a gesture.

6. The system of claim 1, wherein the computer-executable instructions are executable by the processor system further to:
   provide, by the presentation logic, a scoping interface element in the user interface, the scoping interface element enabling a user of the artificial intelligence model to change the scope of the contextual information; and
   determine, by the control logic, that the scope of the contextual information is modified in response to the user action as a result of the presentation logic providing the scoping interface element in the user interface.

7. The system of claim 6, wherein the computer-executable instructions are executable by the processor system further to:
   provide, by the presentation logic, a plurality of selectable interface elements in the scoping interface element, the plurality of selectable interface elements representing a plurality of categories; and
   limit, by the control logic, the scope of the contextual information to a subset of the plurality of categories based on a subset of the plurality of selectable interface elements, which represents the subset of the plurality of categories, being selected in the scoping interface element.

8. A method implemented by a computing system, the method comprising:
   detecting, by prompt determination logic, a current user-generated prompt that is included in a prompt chain, the prompt chain including a series of related prompts that are for providing as successive inputs to an artificial intelligence model such that a context regarding each related prompt in the series is included in a context regarding a next successive related prompt in the series;
   determining, by scope determination logic, that an initial scope of contextual information includes previous contextual information, which includes context regarding a previous user-generated prompt in the prompt chain, wherein the contextual information is not included in the current user-generated prompt, and wherein the contextual information is for providing together with the current user-generated prompt to the artificial intelligence model;
   prior to control logic providing the current user-generated prompt and the contextual information to the artificial intelligence model, automatically changing, by the control logic, the initial scope of the contextual information to provide a changed scope that does not include at least a portion of the previous contextual information; and
   causing, by the control logic, the artificial intelligence model to generate an answer to the current user-generated prompt that is based on the changed scope of the contextual information in lieu of the initial scope of the contextual information by providing the current user-generated prompt together with the contextual information having the changed scope in lieu of the initial scope as inputs to the artificial intelligence model.

9. The method of claim 8, wherein the artificial intelligence model is a large language model.

10. The method of claim 8, wherein the series of related prompts are for providing as successive inputs to the artificial intelligence model in a context of a developer tool; and wherein the contextual information is usable by the AI model to implement functionality associated with the developer tool.

11. The method of claim 10, wherein the current user-generated prompt includes an inquiry regarding a software function; and wherein the changed scope of the contextual information includes the software function.

12. The method of claim 8, wherein automatically changing the initial scope of the contextual information comprises:

adding, by the control logic, supplemental information to the initial scope to provide the changed scope of the contextual information.

13. The method of claim 8, wherein causing the artificial intelligence model to generate the answer to the current user-generated prompt comprises:

delaying, by the control logic, the artificial intelligence model from processing of the current user-generated prompt until the initial scope of the contextual information is changed to provide the changed scope of the contextual information.

14. The method of claim 8, wherein automatically changing the initial scope of the contextual information comprises:

defining, by the control logic, the changed scope of the contextual information to not include the previous contextual information.

15. The method of claim 14, wherein automatically changing the initial scope of the contextual information comprises:

defining, by the control logic, the changed scope of the contextual information to include a previous answer, which was generated by the artificial intelligence model as a response to the previous user-generated prompt.

16. A computer program product comprising a computer-readable storage medium having instructions recorded thereon for enabling a processor-based system to perform operations, the operations comprising:

detecting, by prompt determination logic, a current user-generated prompt that is included in a prompt chain, the prompt chain including a series of related prompts that are for providing as successive inputs to an artificial intelligence model such that a context regarding each related prompt in the series is included in a context regarding a next successive related prompt in the series;

determining, by scope determination logic, that an initial scope of contextual information includes previous contextual information, which includes context regarding a previous user-generated prompt in the prompt chain, wherein the contextual information is not included in the current user-generated prompt, and wherein the contextual information is for providing together with the current user-generated prompt to the artificial intelligence model;

prior to control logic providing the current user-generated prompt and the contextual information to the artificial intelligence model, automatically changing, by the control logic, the initial scope of the contextual information to provide a changed scope that does not include at least a portion of the previous contextual information; and causing, by the control logic, the artificial intelligence model to generate an answer to the current user-generated prompt that is based on the changed scope of the contextual information in lieu of the initial scope of the contextual information by providing the current user-generated prompt together with the contextual information having the changed scope in lieu of the initial scope as inputs to the artificial intelligence model.

17. The computer program product of claim 16, wherein the operations comprise:

delaying, by the control logic, the artificial intelligence model from processing of the current user-generated prompt until the initial scope of the contextual information is changed to provide the changed scope of the contextual information.

18. The computer program product of claim 16, wherein the operations comprise:

defining, by the control logic, the changed scope of the contextual information to not include the previous contextual information.

19. The computer program product of claim 16, wherein the operations comprise:

defining, by the control logic, the changed scope of the contextual information to include a previous answer, which was generated by the artificial intelligence model as a response to the previous user-generated prompt.

20. The system of claim 1, wherein the computer-executable instructions are executable by the processor system to:

determine, by the control logic, that the scope of the contextual information is reduced in accordance with the user action to provide a reduced scope; and in response to the control logic determining that the scope of the contextual information is reduced, cause, by the control logic, the artificial intelligence model to generate the answer to the user-generated prompt that is based on the contextual information having the reduced scope by providing the user-generated prompt and the contextual information having the reduced scope as the inputs to the artificial intelligence model.

* * * * *